(12) United States Patent
Okuda et al.

(10) Patent No.: US 10,644,614 B2
(45) Date of Patent: May 5, 2020

(54) CONVERSION DEVICE HAVING A CONTROL UNIT FOR DETECTING ARM SHORT-CIRCUIT

(71) Applicant: Sumitomo Electric Industries, Ltd., Osaka-shi (JP)

(72) Inventors: Yuji Okuda, Osaka (JP); Naoki Ayai, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 15/548,366

(22) PCT Filed: Jan. 28, 2016

(86) PCT No.: PCT/JP2016/052425
§ 371 (c)(1),
(2) Date: Aug. 2, 2017

(87) PCT Pub. No.: WO2016/139990
PCT Pub. Date: Sep. 9, 2016

(65) Prior Publication Data
US 2018/0034386 A1   Feb. 1, 2018

(30) Foreign Application Priority Data

Mar. 5, 2015  (JP) ................. 2015-043849

(51) Int. Cl.
*H02M 7/00* (2006.01)
*H02M 7/797* (2006.01)
(Continued)

(52) U.S. Cl.
CPC ............ *H02M 7/797* (2013.01); *H02M 1/08* (2013.01); *H02M 1/32* (2013.01); *H02M 3/155* (2013.01);
(Continued)

(58) Field of Classification Search
None
See application file for complete search history.

(56) References Cited

U.S. PATENT DOCUMENTS 4,777,579 A * 10/1988 Jahns .................. H02M 7/5387
363/132
5,687,049 A * 11/1997 Mangtani ............ H02H 7/1227
361/18
(Continued)

FOREIGN PATENT DOCUMENTS

EP    1581407 A2    10/2005
JP    S60-210162 A  10/1985
(Continued)

OTHER PUBLICATIONS

Seiki, "Basics and Practice of Utilization of Power Device IGBT," First Edition, CQ Publishing Co., Ltd., Apr. 1, 2011, pp. 77-81.
(Continued)

*Primary Examiner* — Jue Zhang
*Assistant Examiner* — Henry Lee, III
(74) *Attorney, Agent, or Firm* — Baker Botts, L.L.P.; Michael A. Sartori

(57) ABSTRACT

This conversion device includes: a DC bus with a smoothing capacitor; a first converter provided between a DC power supply and the DC bus to perform DC/DC conversion; a second converter provided between the DC bus and an AC electric path to perform DC/AC or AC/DC conversion by a full-bridge of switching elements; a voltage sensor for detecting voltage between both ends of the capacitor as DC bus voltage; and a control unit which causes a part of an absolute value of an AC waveform, and a DC waveform, to alternately arise as the DC bus voltage by selectively causing the first converter and the second converter to operate in one AC cycle of the AC electric path, the control unit detecting arm short-circuit in the second converter on the (Continued)

basis of a degree of reduction, in the DC bus voltage, that occurs during operation of the second converter.

5 Claims, 10 Drawing Sheets

(51) Int. Cl.
*H02M 3/155* (2006.01)
*H02M 7/48* (2007.01)
*H02M 3/156* (2006.01)
*H02M 1/08* (2006.01)
*H02M 1/32* (2007.01)
*H02M 1/00* (2006.01)

(52) U.S. Cl.
CPC ............ *H02M 3/156* (2013.01); *H02M 7/48* (2013.01); *H02M 2001/007* (2013.01); *H02M 2001/0048* (2013.01)

(56) References Cited

U.S. PATENT DOCUMENTS

| | | | |
|---|---|---|---|
| 9,376,056 B2* | 6/2016 | Ueno | ............... H02M 7/48 |
| 9,800,176 B2* | 10/2017 | Ding | ............... H02M 7/537 |
| 2013/0121051 A1 | 5/2013 | Weiss et al. | |
| 2015/0089972 A1* | 4/2015 | Kanniya | ............... F25B 13/00 62/467 |
| 2015/0256106 A1* | 9/2015 | Yuan | ............... H02M 7/5387 363/132 |
| 2015/0357935 A1* | 12/2015 | Ding | ............... H03K 17/0828 363/131 |

FOREIGN PATENT DOCUMENTS

| | | |
|---|---|---|
| JP | H08-088982 A | 4/1996 |
| JP | H08-106328 A | 4/1996 |
| JP | 2000-152661 A | 5/2000 |
| JP | 2007-202299 A | 8/2007 |
| JP | 2014-093786 A | 5/2014 |
| WO | 2004/064235 A2 | 7/2004 |
| WO | 2013/069326 A1 | 5/2013 |

OTHER PUBLICATIONS

Ahmed et al., "Dual-Mode Time-Sharing One-Stage Single-Phase Power Conditioner Using Sinewave Tracked Soft Switching PWM Boost Chopper," IAS 2005, pp. 1612-1617, XP 10842610 [Cited in EESR issued in counterpart European Patent Application No. 16758686.6 dated Oct. 1, 2018].

* cited by examiner

CONVERSION DEVICE HAVING A CONTROL UNIT FOR DETECTING ARM SHORT-CIRCUIT

TECHNICAL FIELD

The present invention relates to a conversion device for conversion from DC to AC, or a conversion device for conversion in a direction opposite thereto, and in particular, relates to detection of arm short-circuit.

BACKGROUND ART

A conversion device for performing power conversion is provided with an inverter circuit having semiconductor switching elements connected in a full-bridge form, for example. In the inverter circuit, a pair of upper and lower arms (each including a switching element and a reverse-parallel diode) are provided in series to each other between voltage lines. As long as normal switching operation is performed, arm short-circuit in which the pair of upper and lower switching elements are turned on at the same time does not occur. However, if arm short-circuit occurs due to erroneous operation by noise, failure, or the like, overcurrent continues to flow, so that the switching elements that are still usable are broken. Considering this, a current sensor or a shunt resistor for detecting arm short-circuit current is provided in the circuit (see, for example, Patent Literature 1, Non Patent Literature 1), and when arm short-circuit current is detected, operation is stopped, to protect the switching elements.

CITATION LIST

Patent Literature

Patent Literature 1: Japanese Laid-Open Patent Publication No. H08-88982 (FIG. 1)

Non Patent Literature

Non Patent Literature 1: Igarashi Seiki, "Basics and practice of utilization of power device IGBT", first edition, CQ Publishing Co., Ltd., Apr. 1, 2011, pp. 77-81

SUMMARY OF INVENTION

Technical Problem

However, when the current sensor for arm short-circuit detection is provided in addition to sensors needed for control, a mounting space on the board expands accordingly. Due to this, if parasitic inductance increases, surge voltage due to switching increases, whereby stable operation of the conversion device might be hindered. On the other hand, the shunt resistor is less problematic in terms of the space on the board as compared to the current sensor, but loss occurs because current constantly flows, and this is one factor of reducing the conversion efficiency.

In view of such conventional problems, an object of the present invention is to enable detection of arm short-circuit in a conversion device without additionally providing a current sensor or the like.

Solution to Problem

The present invention is a conversion device interposed between a DC power supply and an AC electric path, the conversion device including: a DC bus which is provided between the DC power supply and the AC electric path and to which a smoothing capacitor is connected; a first converter provided between the DC power supply and the DC bus and configured to perform DC/DC conversion; a second converter provided between the DC bus and the AC electric path and configured to perform DC/AC conversion or AC/DC conversion with use of switching elements connected in a full-bridge form; a voltage sensor configured to detect voltage between both ends of the capacitor as DC bus voltage; and a control unit configured to cause a part of an absolute value of an AC waveform, and a DC waveform, to alternately arise as the DC bus voltage by selectively causing the first converter and the second converter to operate in one AC cycle of the AC electric path, the control unit detecting arm short-circuit in the second converter on the basis of a degree of reduction, in the DC bus voltage, that occurs during operation of the second converter.

Advantageous Effects of Invention

The conversion device of the present invention enables detection of arm short-circuit without additionally providing a current sensor or the like.

DESCRIPTION OF EMBODIMENTS

Figure 1:
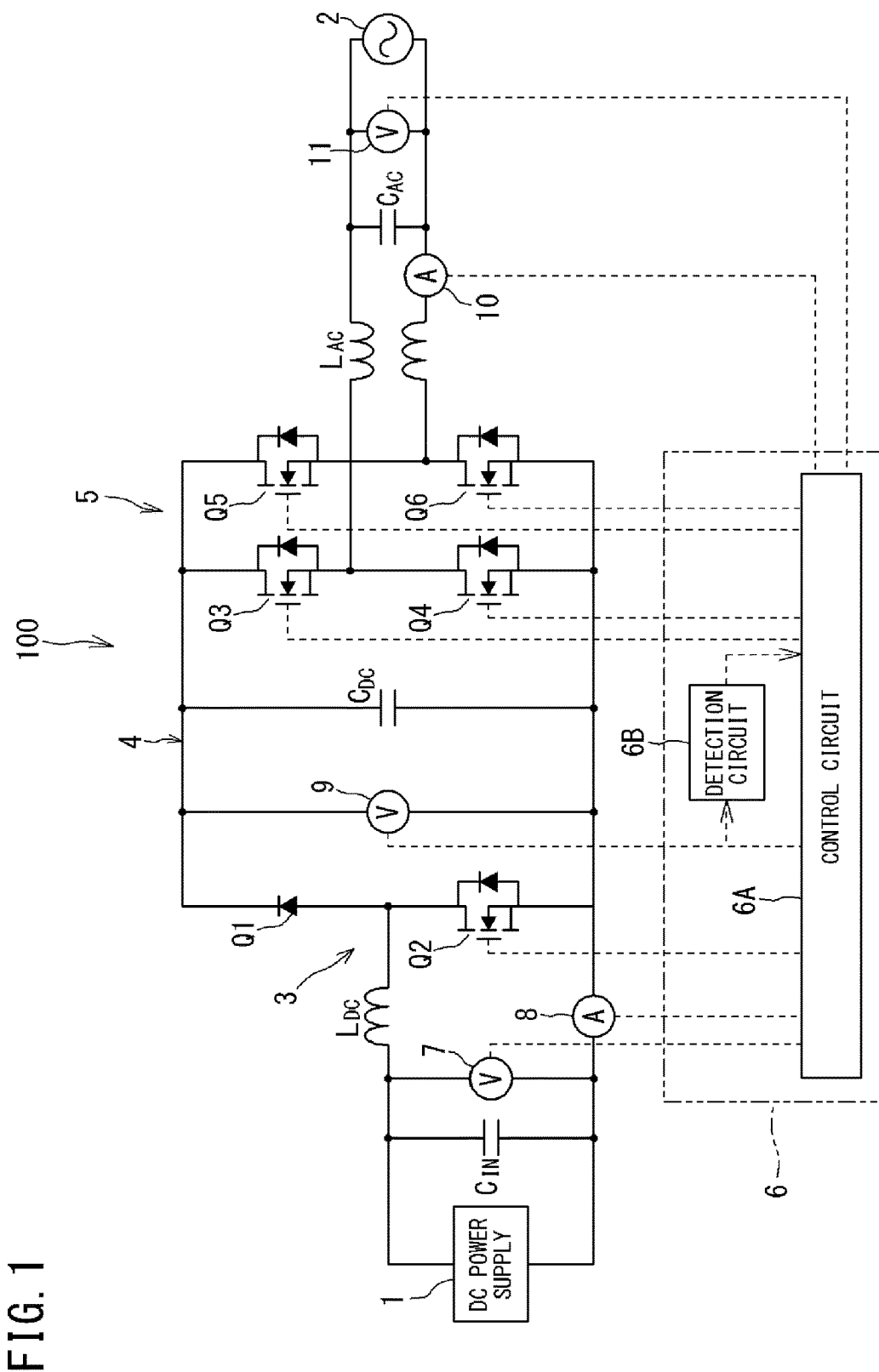
FIG. 1 is a circuit diagram of a conversion device according to the first embodiment of the present invention.

[Summary of Embodiments]
Summary of embodiments of the present invention includes at least the following.

(1) This conversion device is interposed between a DC power supply and an AC electric path, and includes: a DC bus which is provided between the DC power supply and the AC electric path and to which a smoothing capacitor is connected; a first converter provided between the DC power supply and the DC bus and configured to perform DC/DC conversion; a second converter provided between the DC bus and the AC electric path and configured to perform DC/AC conversion or AC/DC conversion with use of switching elements connected in a full-bridge form; a voltage sensor configured to detect voltage between both ends of the capacitor as DC bus voltage; and a control unit configured to cause a part of an absolute value of an AC waveform, and a DC waveform, to alternately arise as the DC bus voltage by selectively causing the first converter and the second converter to operate in one AC cycle of the AC electric path, the control unit detecting arm short-circuit in the second converter on the basis of a degree of reduction, in the DC bus voltage, that occurs during operation of the second converter.

In such a conversion device, the first converter and the second converter alternately perform high-frequency switching operations to generate a desired waveform, unlike a conventional conversion device in which the first converter and the second converter constantly perform high-frequency switching operations. For example, in a case of performing conversion from DC to AC, the first converter generates a part of the absolute value of a desired AC waveform in one cycle, and outputs the same to the DC bus. Here, the capacitor has a comparatively small capacitance so that a high-frequency component due to switching, contained in output of the first converter, is removed, whereas a component having a frequency approximately twice as high as the frequency of the AC waveform is not smoothed. Therefore, at the time of discharging, the voltage reduces very quickly. When arm short-circuit occurs in the second converter, electric charge of the capacitor is lost through the short-circuited arm. Therefore, it is possible to detect occurrence of arm short-circuit on the basis of the degree of reduction in the DC bus voltage which is voltage between both ends of the capacitor. That is, it is possible to reliably detect arm short-circuit by the voltage sensor which is originally needed for control, without additionally providing a current sensor for arm short-circuit detection.

(2) In the conversion device of (1), the degree of reduction is, for example, a slope of reduction, and a phenomenon in which the DC bus voltage reduces at a slope steeper than a threshold value may be detected as arm short-circuit in the second converter.

In this case, the slope can be immediately calculated through differential operation, and thus the arm short-circuit can be swiftly detected.

(3) The conversion device of (1) may further include a voltage sensor configured to detect input voltage from the DC power supply, and may be configured such that the degree of reduction is a difference between the input voltage and the DC bus voltage, and a phenomenon in which the difference exceeds a threshold value is detected as arm short-circuit in the second converter.

In this case, it is possible to easily and reliably detect arm short-circuit through a simple calculation process of merely comparing the voltage difference with the threshold value.

(4) In the conversion device of any one of (1) to (3), preferably, when the arm short-circuit is detected, the control unit stops operations of the first converter and the second converter on the basis of a short-circuit withstand capability of the switching elements.

In this case, the switching element at which arm short-circuit occurs can be protected.

[Details of Embodiments]

Hereinafter, the details of embodiments will be described with reference to the drawings.

<First Embodiment>
<<Circuit Configuration>>

FIG. 1 is a circuit diagram of a conversion device 100 according to the first embodiment of the present invention. The conversion device 100 is interposed between a DC power supply 1 and an AC electric path 2, and here, performs power conversion from DC to AC, for example. Examples of such a system including the conversion device 100 include a stand-alone power generation system in which the DC power supply 1 as a storage battery is discharged to make an AC power supply, and a system that performs power interconnection from the DC power supply 1 as a photovoltaic panel to the AC electric path 2 as a commercial power grid.

The conversion device 100 includes: a boost converter 3 as a first converter, which is provided between the DC power supply 1 and a DC bus 4 and performs DC/DC conversion; an inverter circuit 5 as a second converter, which is provided between the DC bus 4 and the AC electric path 2 and performs DC/AC conversion; and a control unit 6 which controls switching of the boost converter 3 and the inverter circuit 5.

The boost converter 3 is composed of a DC reactor $L_{DC}$, a diode Q1, and a switching element Q2 such as FET (Field Effect Transistor) which are connected as shown in FIG. 1. The inverter circuit 5 is composed of switching elements Q3, Q4, Q5, Q6 such as FETs which are connected in a full-bridge form.

A smoothing capacitor $C_{IN}$ is connected to the DC power supply 1. A smoothing capacitor $C_{DC}$ is connected to the DC bus 4. Between the inverter circuit 5 and the AC electric path 2, there are provided an AC reactor $L_{AC}$ and a capacitor $C_{AC}$ for smoothing which serve as a filter for preventing high-frequency noise due to switching from leaking to the AC electric path 2 side.

As sensors needed for control, provided are: a voltage sensor 7 which detects input voltage from the DC power supply 1 as voltage between both ends of the capacitor $C_{IN}$; a current sensor 8 which detects current flowing through the boost converter 3; a voltage sensor 9 which detects DC bus voltage as voltage between both ends of the capacitor $C_{DC}$; a current sensor 10 which detects current flowing through the AC reactor $L_{AC}$; and a voltage sensor 11 which detects output voltage to the AC electric path 2. The voltage/current information outputted from each sensor is inputted to a control circuit 6A. The voltage information outputted from the voltage sensor 9 is inputted also to a detection circuit 6B. The control unit 6 is composed of the control circuit 6A and the detection circuit 6B.

<<Operation of Conversion Device>>

Next, operation of the conversion device 100 configured as described above will be described.

Conventionally, in a general conversion device of this type, the boost converter 3 constantly performs step-up operation to a certain level of DC voltage. The inverter circuit 5 converts the DC voltage to AC voltage through switching by PWM (Pulse Width Modulation) control.

On the other hand, in the conversion device 100 in FIG. 1, the boost converter 3 and the inverter circuit 5 perform high-frequency switching operations by PWM control, temporally alternately. In other words, the boost converter 3 and the inverter circuit 5 each have a period during which high-frequency switching is stopped. Thus, the number of times of switching in the conversion device 100 as a whole is, as it were, minimized, and therefore this control method is referred to as a "minimum switching conversion method".

Figure 2:
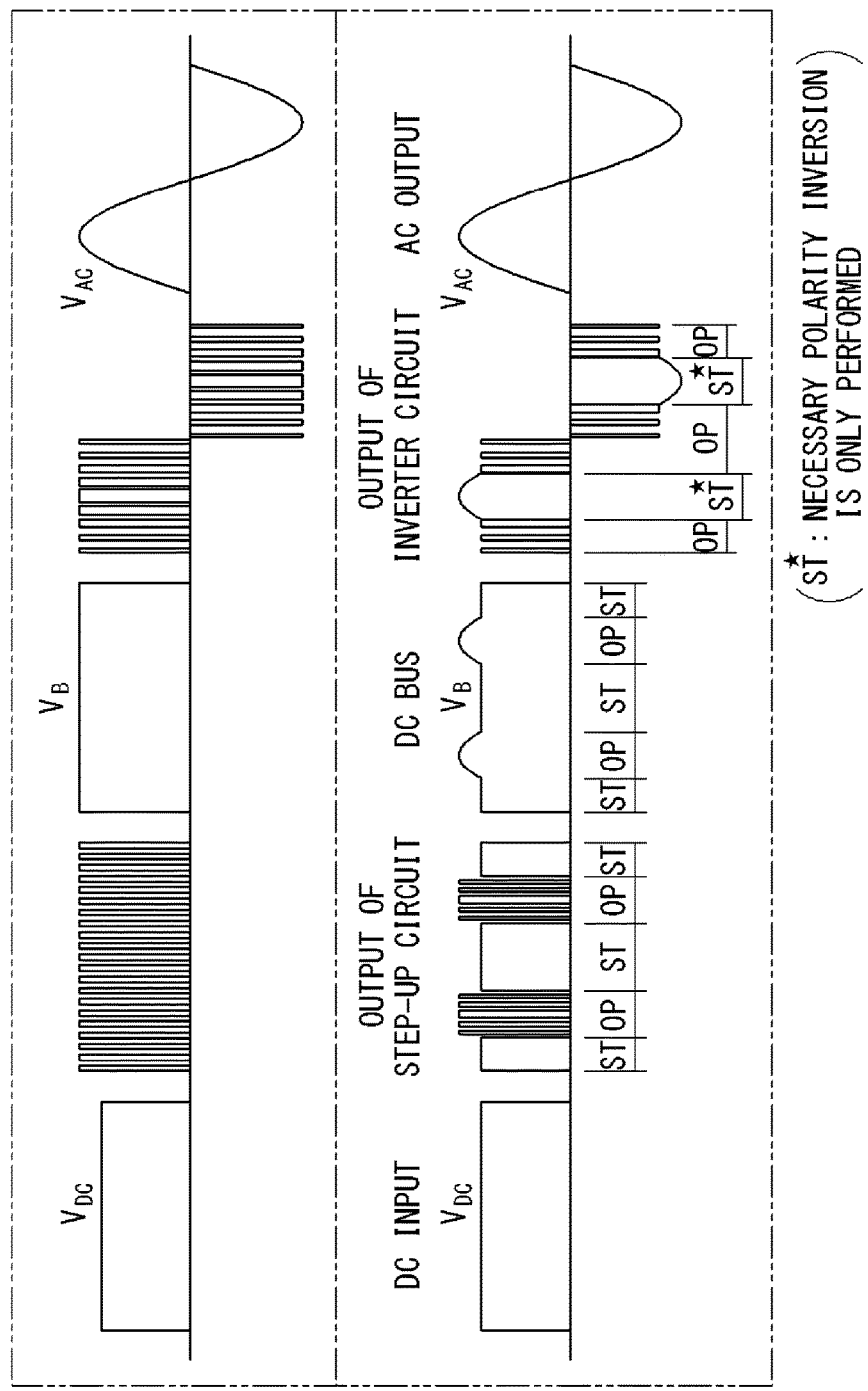
FIG. 2 is a waveform diagram schematically showing the feature of operation of the conversion device, and shows the amplitude relationship from DC input to AC output in an easily understandable way.
Figure 3:
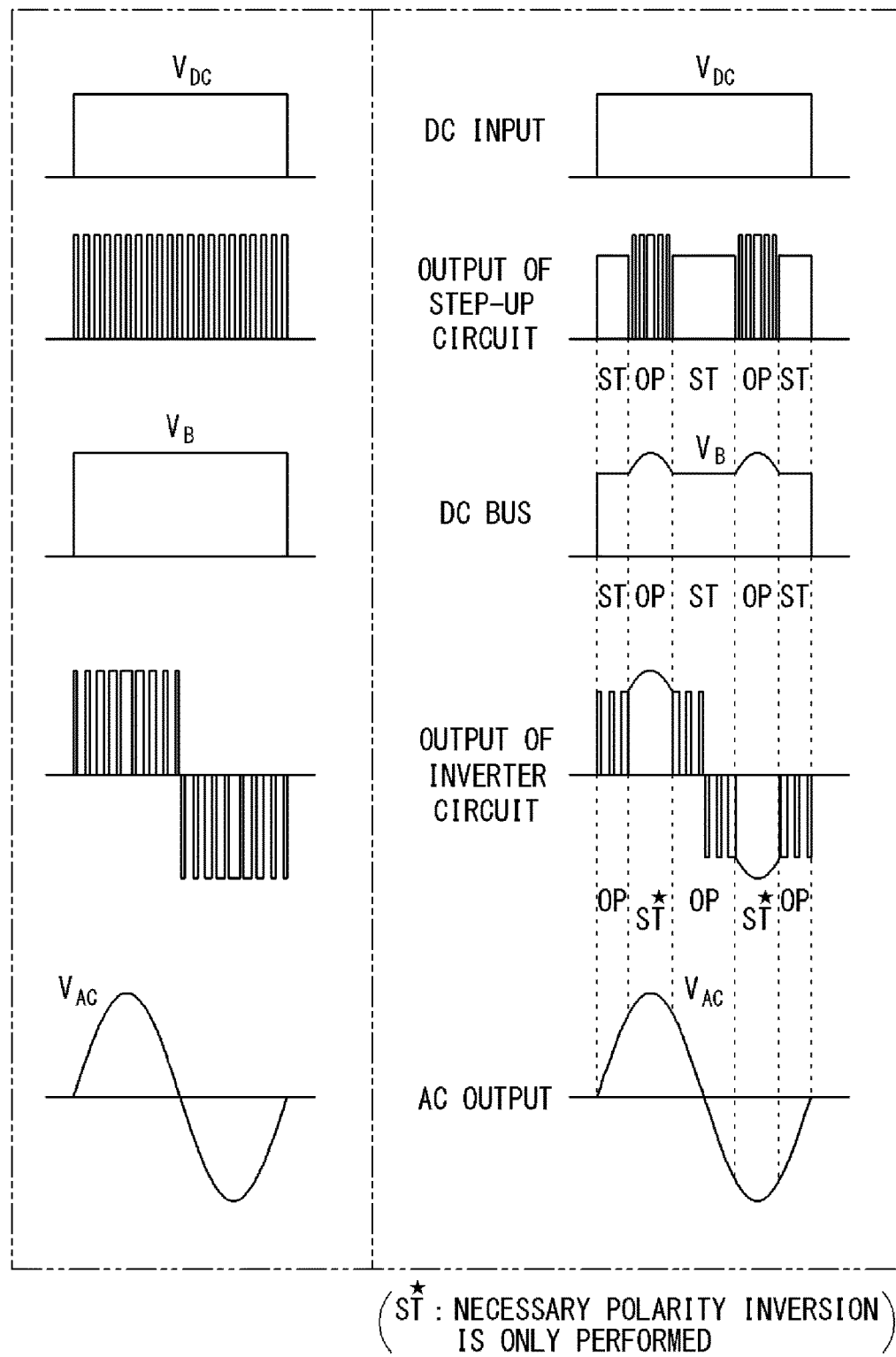
FIG. 3 is a waveform diagram schematically showing the feature of operation of the conversion device as in FIG. 2, and shows control timings in an easily understandable way.

FIG. 2 and FIG. 3 are waveform diagrams schematically showing the feature of operation of the conversion device 100. FIG. 2 and FIG. 3 show the same content, in which FIG. 2 particularly shows the amplitude relationship from DC input to AC output in an easily understandable way, and FIG. 3 particularly shows control timings in an easily understandable way. The upper stage in FIG. 2 and the left column in FIG. 3 are waveform diagrams showing operation of a conventional conversion device not using the minimum switching conversion method, for comparison. The lower stage in FIG. 2 and the right column in FIG. 3 are waveform diagrams showing operation of the conversion device 100 using the minimum switching conversion method.

First, in the upper stage in FIG. 2 (or the left column in FIG. 3), in the conventional conversion device, output of the boost converter in response to DC input, i.e., DC voltage $V_{DC}$, is a pulse train having a higher value than $V_{DC}$ and arranged at regular intervals. This output is smoothed by a capacitor and thereby arises as voltage $V_B$ on the DC bus. On the other hand, the inverter circuit performs switching under PWM control while inverting the polarity per half cycle. As a result, after final smoothing is performed, sinusoidal AC voltage $V_{AC}$ as AC output is obtained.

Next, in the minimum switching conversion method at the lower stage in FIG. 2, the boost converter 3 and the inverter circuit 5 in FIG. 1 operate in accordance with a result of comparison between the instantaneous value of the voltage target value $V_{AC}$ having an AC waveform, and the DC voltage $V_{DC}$ which is input. That is, when the absolute value of the voltage target value $V_{AC}$ satisfies $V_{AC} < V_{DC}$ (or $V_{AC} \leq V_{DC}$), the boost converter 3 is stopped ("ST" in the drawing), and when the absolute value of the voltage target value $V_{AC}$ satisfies $V_{AC} \geq V_{DC}$ (or $V_{AC} > V_{DC}$), the boost converter 3 performs step-up operation ("OP" in the drawing). Output of the boost converter 3 is smoothed by the capacitor $C_{DC}$ and the resultant output arises on the DC bus 4, as voltage $V_B$ shown in the drawing.

On the other hand, as for the inverter circuit 5, in accordance with a result of comparison between the absolute value of the voltage target value $V_{AC}$ and the DC voltage $V_{DC}$, when $V_{AC} < V_{DC}$ (or $V_{AC} \leq V_{DC}$) is satisfied, high-frequency switching is performed ("OP" in the drawing), and when $V_{AC} \geq V_{DC}$ (or $V_{AC} > V_{DC}$) is satisfied, the high-frequency switching is stopped ("ST" in the drawing). When the inverter circuit 5 stops high-frequency switching, the inverter circuit 5 selects either the state in which the switching elements Q3, Q6 are ON and the switching elements Q4, Q5 are OFF, or the state in which the switching elements Q3, Q6 are OFF and the switching elements Q4, Q5 are ON, thereby only performing necessary polarity inversion. Output of the inverter circuit 5 is smoothed by the AC reactor $L_{AC}$ and the capacitor $C_{AC}$, whereby desired AC output is obtained.

Here, as shown in the right column in FIG. 3, the boost converter 3 and the inverter circuit 5 alternately perform high-frequency switching operations. When the boost converter 3 performs step-up operation, the inverter circuit 5 stops high-frequency switching and only performs necessary polarity inversion for the voltage of the DC bus 4. On the other hand, when the inverter circuit 5 performs high-frequency switching operation, the boost converter 3 is stopped and voltage between both ends of the capacitor $C_{IN}$ arises on the DC bus 4 via the DC reactor $L_{DC}$ and the diode Q1.

The operation of the conversion device 100 by the minimum switching conversion method is performed as described above.

It is noted that, in a case of using the conversion device 100 in a system in which power interconnection is performed from the DC power supply 1 as a photovoltaic panel to the AC electric path 2 as a commercial power grid, further, optimum power interconnection can be achieved with an excellent conversion efficiency by considering electric behaviors of the capacitor $C_{AC}$, the AC reactor $L_{AC}$, the capacitor $C_{DC}$, and the DC reactor $L_{DC}$.

In the above conversion device 100, owing to control by the minimum switching conversion method, the capacitance $C_{DC}$ of the capacitor $C_{DC}$ connected to the DC bus 4 becomes, for example, 22 µF. In a case of the conventional conversion device having the same rated capacity and not using the minimum switching conversion method, the capacitance becomes a large value, e.g., 2 mF or 5 mF. That is, owing to control by the minimum switching conversion method, the capacitance of the capacitor $C_{DC}$ connected to the DC bus 4 becomes a very small value.

This is because the capacitance of the capacitor $C_{DC}$ is set to be small so that, as shown in the voltage of the DC bus in the lower stage in FIG. 2 and in the right column in FIG. 3, a part of the AC waveform generated by the boost converter 3 will not become vague by smoothing. That is, the capacitance of the capacitor $C_{DC}$ is selected to be a proper value so that the smoothing works to the extent that eliminates the trace of high-frequency switching of the boost converter 3, but cannot smooth a low-frequency wave having a frequency approximately twice as high as the commercial frequency. If the capacitance is significantly greater (for example, 2 mF) than the proper value, the low-frequency wave having a frequency approximately twice as high as the commercial frequency is also smoothed, whereby the shape of the waveform is made vague. By selecting the proper value, it becomes possible to obtain a desired waveform including a part of the absolute value of the AC waveform while removing high-frequency voltage variation due to switching.

<<Detection of Arm Short-circuit>>

The fact that the capacitor $C_{DC}$ connected to the DC bus 4 has a small capacitance provides an unexpected advantage, as well as the effect of keeping the waveform as described above. This advantage is that, when arm short-circuit (for example, switching elements Q3, Q4 are turned on at the same time or switching elements Q5, Q6 are turned on at the same time) occurs in the inverter circuit 5, a phenomenon occurs in which electric charge accumulated in the capacitor $C_{DC}$ is discharged in an extremely short time and the DC bus voltage detected by the voltage sensor 9 sharply drops.

Specifically, when arm short-circuit occurs, current $I_{arm}$ flowing from the capacitor $C_{DC}$ to the short-circuited arm is represented as follows:

$$I_{arm} = -C_{DC}(dV_B/dt) \quad (1)$$

where $V_B$ is the DC bus voltage.

The expression (1) is deformed as follows:

$$(dV_B/dt) = -(I_{arm})/C_{DC} \quad (1')$$

The capacitance $C_{DC}$ is, for example, 22 µF, and thus is extremely smaller than the conventional value such as 2 mF. Therefore, a slope $(dV_B/dt)$ at which the DC bus voltage reduces is extremely great. That is, as described above, the DC bus voltage detected by the voltage sensor 9 sharply drops.

Figure 4:
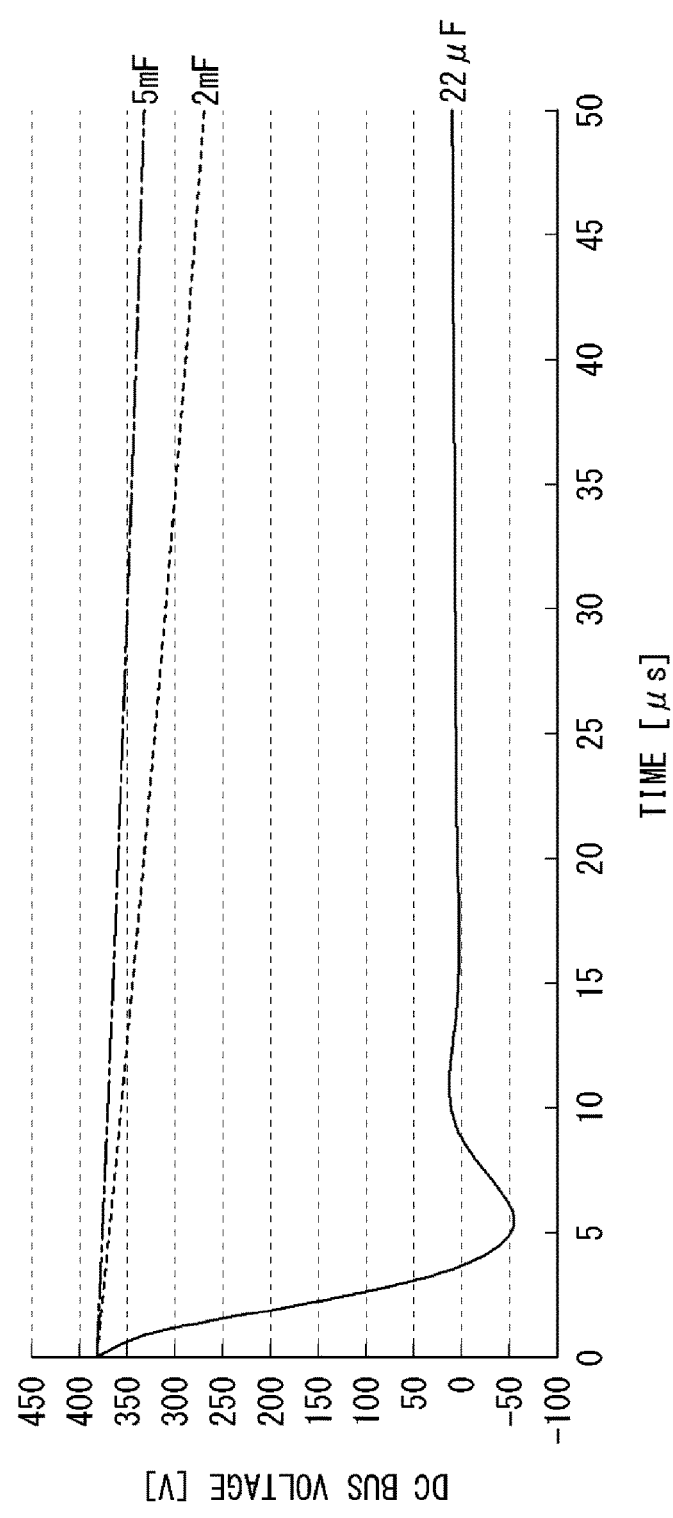
FIG. 4 is a graph showing change in DC bus voltage immediately after occurrence of arm short-circuit.

FIG. 4 is a graph showing change in the DC bus voltage immediately after occurrence of arm short-circuit. The horizontal axis indicates time [µs], and the vertical axis indicates voltage [V]. In FIG. 4, change characteristics shown by a solid line indicate the DC bus voltage when the capacitance of the capacitor $C_{DC}$ is 22 µF. In addition, change characteristics shown by a broken line indicate the DC bus voltage when the capacitance of the capacitor $C_{DC}$ is 2 mF. Further, change characteristics shown by a dotted-dashed line indicate the DC bus voltage when the capacitance of the capacitor $C_{DC}$ is 5 mF.

As is obvious from FIG. 4, when the capacitance is 5 mF or 2 mF, the way of reduction of the DC bus voltage is gradual, whereas, when the capacitance is 22 µF, the DC bus voltage reduces to 0V within mere 5µ seconds.

Accordingly, by detecting the DC bus voltage by the voltage sensor 9, it is possible to detect occurrence of arm short-circuit on the basis of the degree of reduction thereof. Therefore, a current sensor for detecting short-circuit current due to arm short-circuit is not needed. Thus, it is possible to swiftly detect arm short-circuit, using output of the voltage sensor 9 which is originally needed for control, without additionally providing a current sensor. Hereinafter, a specific example of such arm short-circuit detection will be described.

<<Example of Detection Circuit>>

Figure 5:
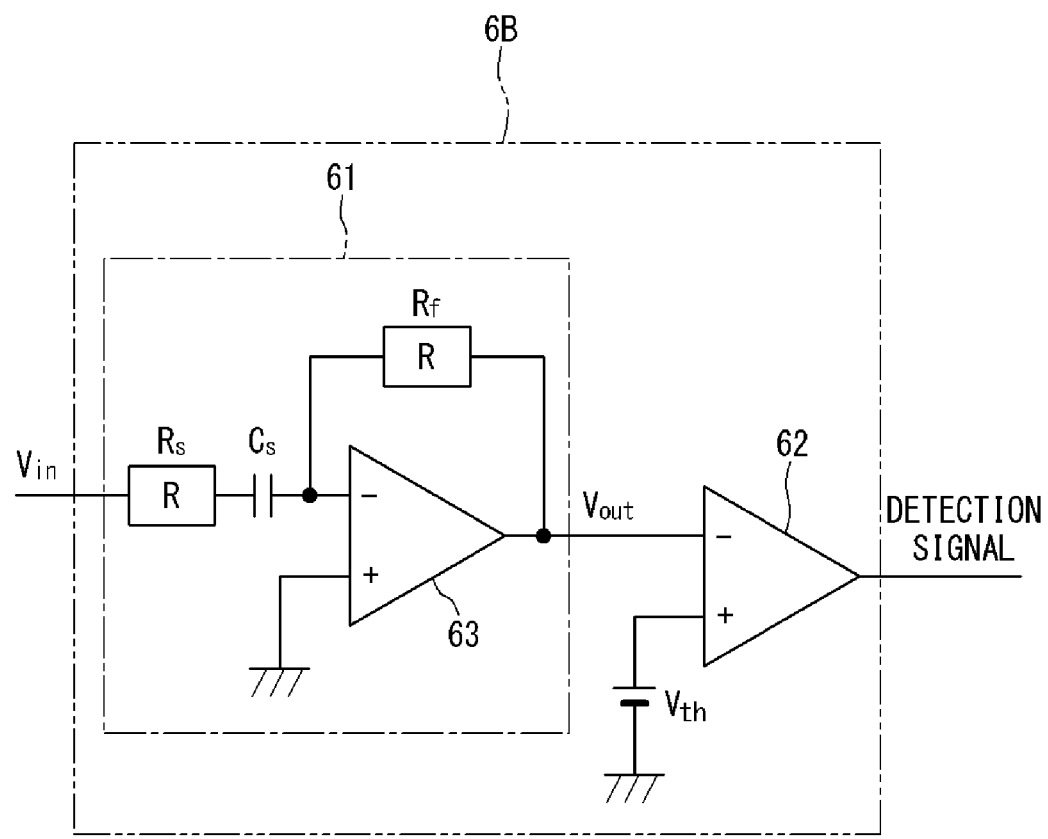
FIG. 5 is an example of an internal circuit diagram of a detection circuit in FIG. 1.

FIG. 5 is an example of an internal circuit diagram of the detection circuit 6B in FIG. 1. In FIG. 5, the detection circuit 6B includes a differentiator 61 and a comparator 62. The differentiator 61 is configured by connecting an input resistance $R_S$ (resistance value $R_S$), a capacitor $C_S$ (capacitance $C_S$), and a feedback resistance $R_f$ (resistance value $R_f$) to an operational amplifier 63, as shown in FIG. 5.

The numerical value examples of the resistance value $R_S$, the capacitance $C_S$, and the resistance value $R_f$ are $R_S$=0 [Ω], $C_S$=240 [pF], and $R_f$=10 [kΩ].

In a case where input voltage of the differentiator 61 is $V_{in}$, output voltage thereof is $V_{out}$, and the frequency (switching frequency of boost converter 3) of the input voltage $V_{in}$ is $f_{in}$, when $f_{in} \ll 1/(2\pi R_S C_S)$ is satisfied, $V_{out}$ is represented as follows:

$$V_{out} = -R_f C_S (dV_{in}/dt) \quad (2)$$

That is, the output voltage $V_{out}$ is proportional to a value obtained by differentiating the input voltage $V_{in}$. Here, $V_{in}$ is a value corresponding to the DC bus voltage. Therefore, output voltage of the differentiator 61 increases as reduction of the DC bus voltage becomes steeper (as the slope becomes greater).

Accordingly, next, the comparator 62 compares $V_{out}$ with a threshold voltage $V_{th}$. For the threshold voltage $V_{th}$, a value within the short-circuit withstand capability of the switching elements Q3 to Q6 is set. When arm short-circuit occurs, the DC bus voltage sharply reduces. Then, when the output voltage $V_{out}$ exceeds the threshold voltage $V_{th}$, the comparator 62 outputs a detection signal of arm short-circuit. In response thereto, the control circuit 6A stops operations of the boost converter 3 and the inverter circuit 5. Therefore, even if arm short-circuit occurs, the switching element that is still usable can be protected.

<<Simulation>>

Figure 6:
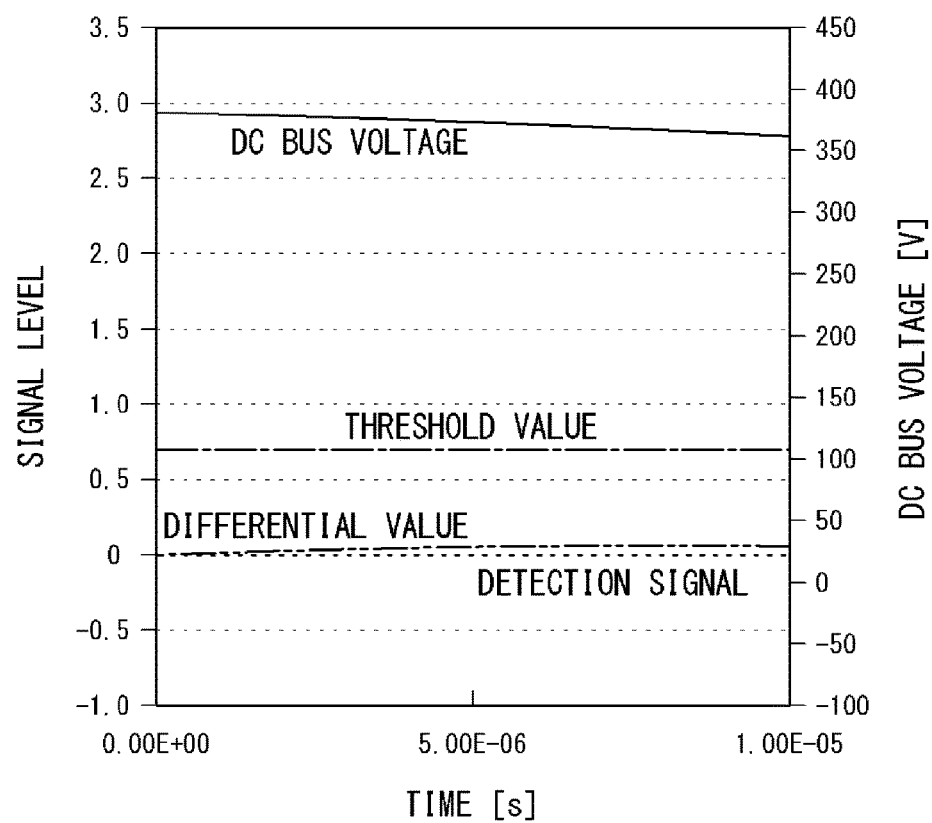
FIG. 6 is a graph, for comparison, on the assumption that the detection circuit in the first embodiment is applied when arm short-circuit occurs in a conventional conversion device.

FIG. 6 is a graph, for comparison, on the assumption that the detection circuit 6B as described above is applied when arm short-circuit occurs in a conventional conversion device (in which the minimum switching conversion method is not used and the capacitance of the capacitor connected to the DC bus is 2.2 mF). The horizontal axis indicates time [s], and the vertical axis indicates voltage [V] or a signal level.

In this case, the DC bus voltage reduces slowly, and the differential value thereof is close to 0. Therefore, the differential value is smaller than a threshold value, and the detection signal is 0. That is, detection cannot be performed.

Figure 7:
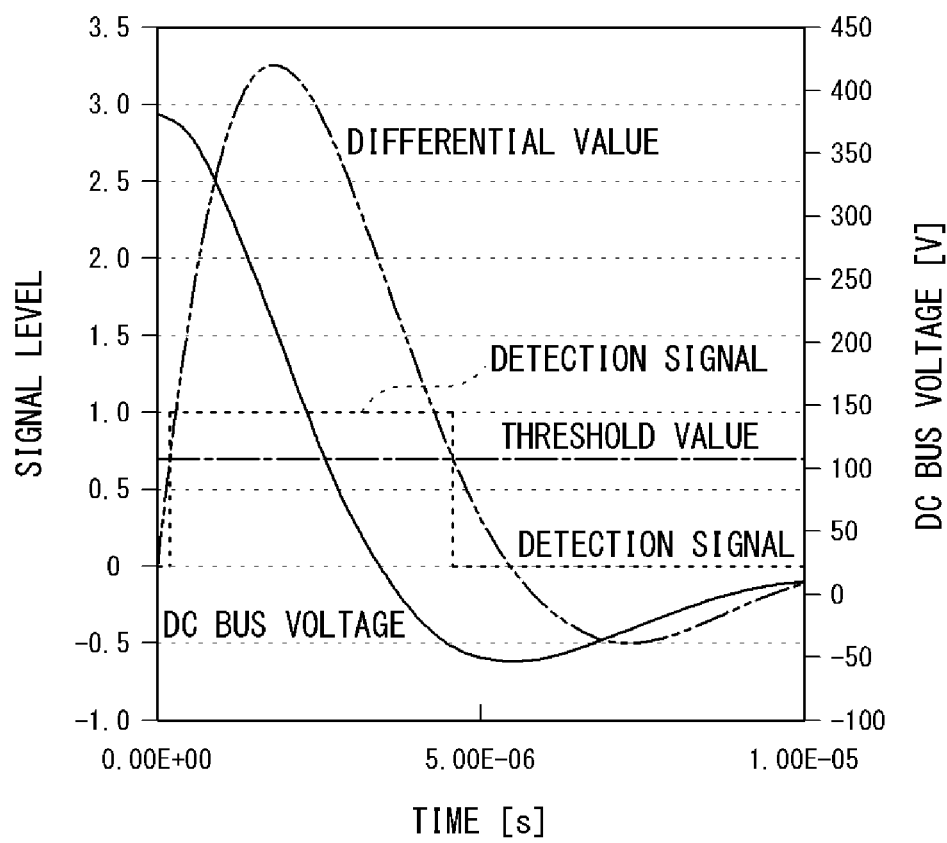
FIG. 7 is a graph when arm short-circuit occurs of the conversion device in the first embodiment.

FIG. 7 is a graph when arm short-circuit occurs in the conversion device 100 of the present embodiment. The horizontal axis indicates time [s], and the vertical axis indicates voltage [V] or a signal level.

In this case, the DC bus voltage sharply drops, and as a result of comparison between the differential value thereof and a threshold value, when the differential value is greater than the threshold value, the detection signal (=1) of arm short-circuit is outputted.

<<Summary>>

In the conversion device 100 of the present embodiment, the boost converter 3 and the inverter circuit 5 alternately perform high-frequency switching operations to generate a desired waveform. In a case of performing conversion from DC to AC, the boost converter 3 generates a part of the absolute value of a desired AC waveform in one cycle, and outputs the same to the DC bus 4. Here, the capacitor $C_{DC}$ has a comparatively small capacitance so that a high-frequency component due to switching, contained in output of the boost converter 3, is removed, whereas a component having a frequency approximately twice as high as the frequency of the AC waveform is not smoothed. Therefore, at the time of discharging, the voltage reduces very quickly. When arm short-circuit occurs in the inverter circuit 5, electric charge of the capacitor $C_{DC}$ is lost through the short-circuited arm. Therefore, it is possible to detect occurrence of arm short-circuit on the basis of the degree of reduction in the DC bus voltage which is voltage between both ends of the capacitor $C_{DC}$. That is, it is possible to reliably detect arm short-circuit by the voltage sensor 9 which is originally needed for control, without additionally providing a current sensor for arm short-circuit detection.

The degree of reduction described above is, for example, the slope of reduction, and a phenomenon in which the DC bus voltage reduces at a slope steeper than a threshold value can be detected as arm short-circuit in the inverter circuit 5. In this case, the slope can be immediately calculated through differential operation, and thus the arm short-circuit can be swiftly detected.

The threshold value to be compared with the differential value is set to a value within the short-circuit withstand capability of the switching elements, and when arm short-circuit is detected, the boost converter 3 and the inverter circuit 5 are stopped, whereby the switching element at which arm short-circuit occurs can be protected.

<<Others>>

The detection circuit 6B in FIG. 5 is configured by, as an example, an analog circuit, separately from the control circuit 6A. However, the functions of the control circuit 6A and the detection circuit 6B may be integrated.

Figure 8:
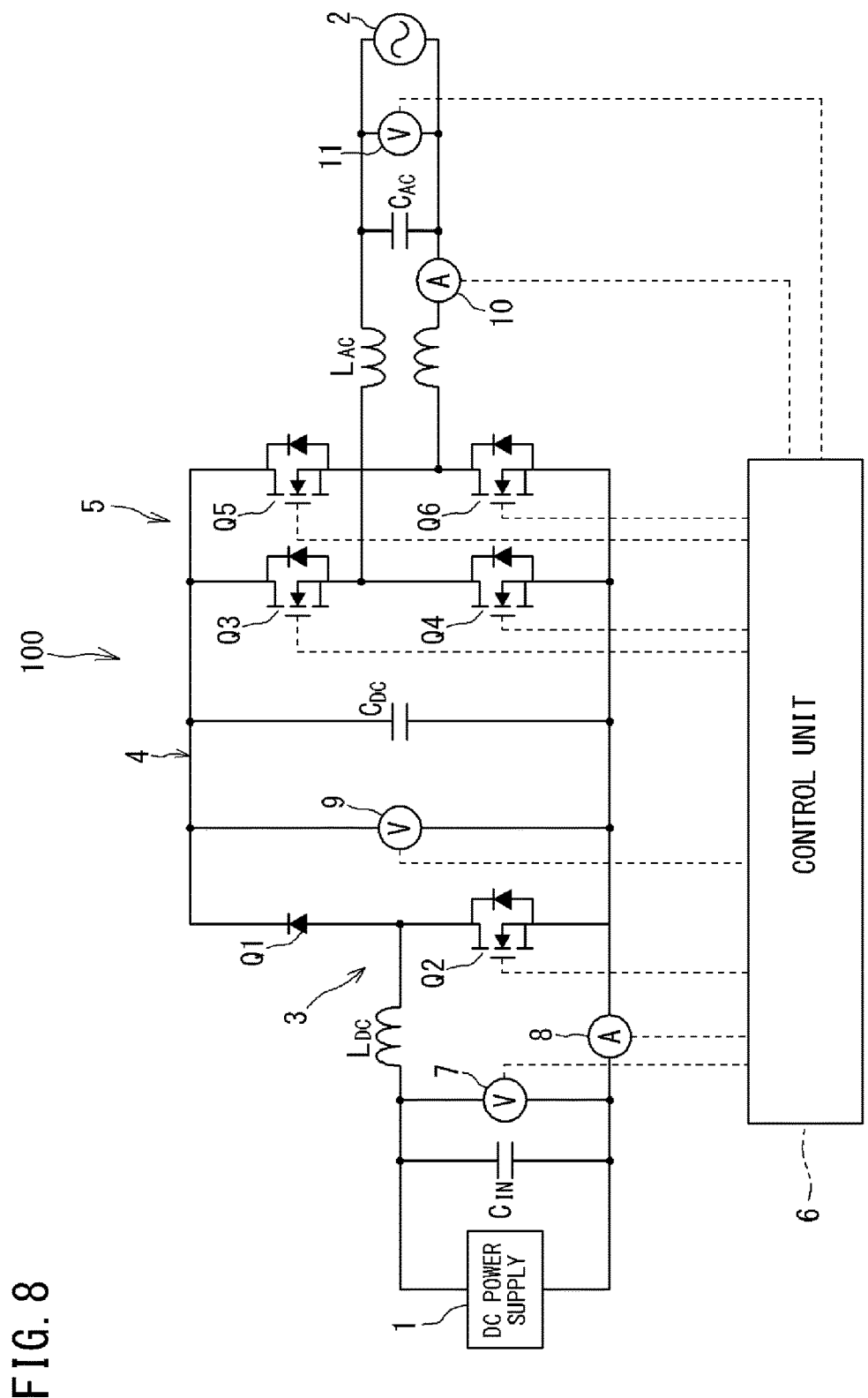
FIG. 8 is a circuit diagram of a conversion device in which functions of a control circuit and a detection circuit are integrated, and also is a circuit diagram of a conversion device according to the second embodiment.

FIG. 8 is a circuit diagram of the conversion device 100 in this case. Difference from FIG. 1 is that the control circuit 6A and the detection circuit 6B are integrated into the control unit 6. Some or all of the functions of the control unit 6 may be realized by a hardware circuit, or some or all of the functions may be realized by software (computer program) being executed by a computer. The software (computer program) for realizing the functions of the control unit 6 is stored in a storage device (not shown) of the computer.

<Second Embodiment>
<<Circuit Configuration>>

The circuit diagram of the conversion device 100 according to the second embodiment is the same as that shown in FIG. 8.

<<Detection of Arm Short-circuit>>

In the first embodiment, differentiation is used for detection of arm short-circuit. However, it is also possible to perform the detection in a different way. For example, in FIG. 8, output of the voltage sensor 7 and output of the voltage sensor 9 are both inputted to the control unit 6. When arm short-circuit occurs, the DC bus voltage sharply drops, whereas input voltage from the DC power supply 1 detected by the voltage sensor 7 does not change. Accordingly, the control unit 6 calculates a difference between the input voltage from the DC power supply 1 and the DC bus voltage, and a phenomenon in which the difference exceeds a threshold value can be detected as arm short-circuit in the inverter circuit 5. The threshold value is set to a value within the short-circuit withstand capability of the switching elements (Q3 to Q6).

In this case, it is possible to easily and reliably detect arm short-circuit through a simple calculation process of merely comparing the voltage difference with the threshold value.

<<Simulation>>

Figure 9:
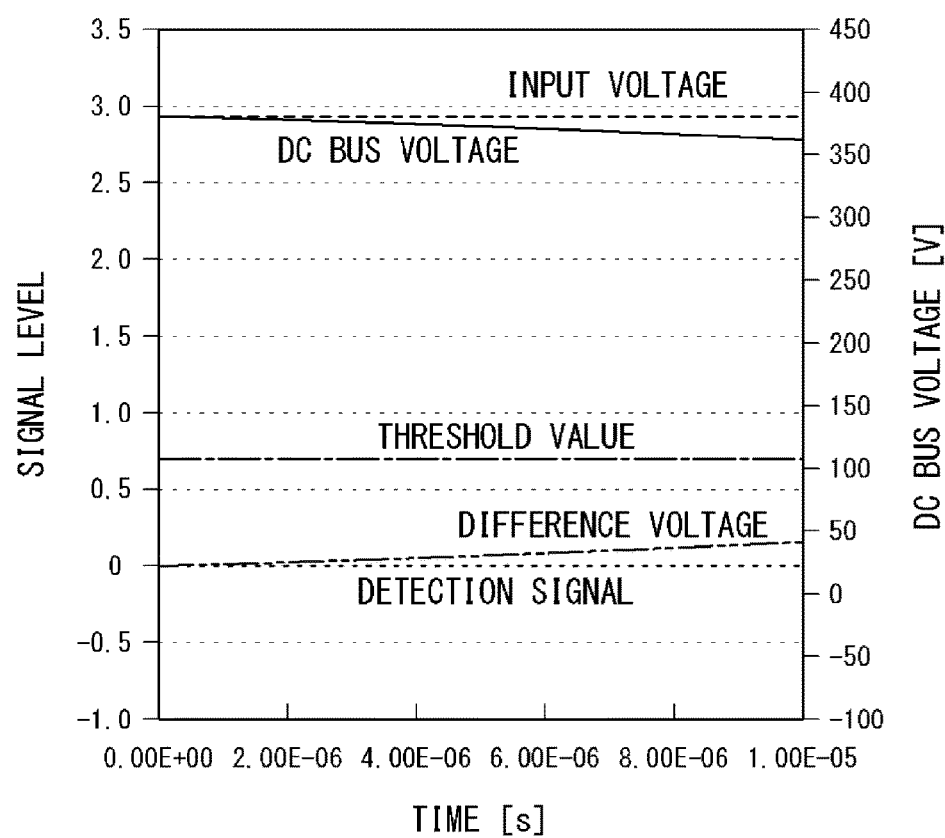
FIG. 9 is a graph, for comparison, on the assumption that difference calculation in the second embodiment is applied when arm short-circuit occurs in a conventional conversion device.

FIG. 9 is a graph, for comparison, on the assumption that the difference calculation as described above is applied when arm short-circuit occurs in a conventional conversion device (in which the minimum switching conversion method is not used and the capacitance of the capacitor connected to the DC bus is 2.2 mF). The horizontal axis indicates time [s], and the vertical axis indicates voltage [V] or a signal level.

In this case, the DC bus voltage reduces slowly, and the difference voltage is close to 0. Therefore, the difference voltage is smaller than the threshold value, and the detection signal is 0. That is, detection cannot be performed.

Figure 10:
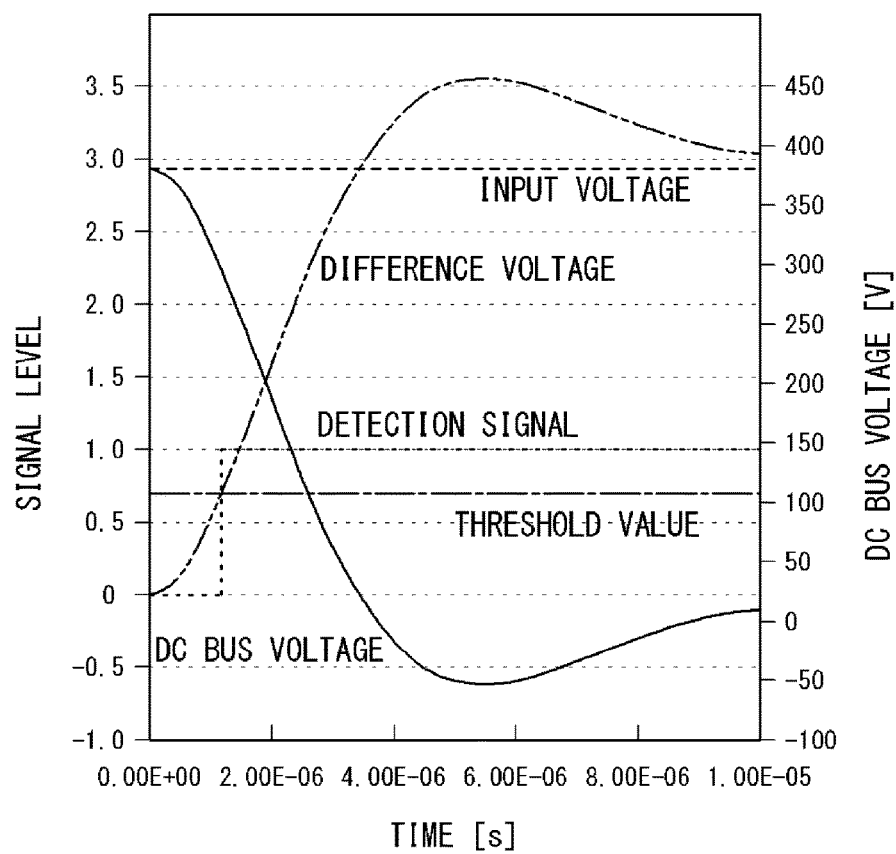
FIG. 10 is a graph when arm short-circuit occurs in the conversion device of the second embodiment, which performs detection of arm short-circuit on the basis of difference voltage.

FIG. 10 is a graph when arm short-circuit occurs in the conversion device 100 of the second embodiment which performs detection of arm short-circuit on the basis of difference voltage. The horizontal axis indicates time [s], and the vertical axis indicates voltage [V] or a signal level.

In this case, the DC bus voltage sharply drops, and as a result of comparison between the threshold value and difference voltage from input voltage, when the difference voltage is greater than the threshold value, the detection signal (=1) of arm short-circuit is outputted.

<Others>

In the above embodiments, only a case of an up direction from the DC power supply 1 to the AC electric path 2 has been described. However, if the diode Q1 in the boost converter 3 in FIG. 1 or FIG. 8 is replaced with a switching element such as FET, it is possible to configure the conversion device 100 in a system in a down direction in which, for example, power is received from the AC electric path 2 as a commercial power grid, to charge the DC power supply 1 as a storage battery. In this case, the inverter circuit 5 becomes an AC/DC converter capable of stepping up voltage in cooperation with the AC reactor $L_{AC}$, and the boost converter 3 becomes a step-down circuit. Also in this case, the manner of conversion is basically the same as that shown in FIG. 2 and FIG. 3 except that the conversion direction is reversed.

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

REFERENCE SIGNS LIST

1 DC power supply
2 AC electric path
3 boost converter
4 DC bus
5 inverter circuit
6 control unit
6A control circuit
6B detection circuit
7 voltage sensor
8 current sensor
9 voltage sensor
10 current sensor
11 voltage sensor
61 differentiator
62 comparator
63 operational amplifier
100 conversion device
$C_{AC}$, $C_{DC}$, $C_{IN}$, $C_S$ capacitor
$L_{AC}$ AC reactor
$L_{DC}$ DC reactor
Q1 diode
Q2, Q3, Q4, Q5, Q6 switching element
$R_S$ input resistance
$R_f$ feedback resistance

The invention claimed is:

1. A conversion device interposed between a DC power supply and an AC electric path, the conversion device comprising:
    a DC bus which is provided between the DC power supply and the AC electric path and to which a smoothing capacitor is connected;
    a first converter provided between the DC power supply and the DC bus and configured to perform DC/DC conversion;
    a second converter provided between the DC bus and the AC electric path and configured to perform DC/AC conversion or AC/DC conversion with use of switching elements connected in a full-bridge form;
    a voltage sensor configured to detect voltage between both ends of the smoothing capacitor as DC bus voltage; and
    a control unit configured to cause a part of an absolute value of an AC waveform, and a DC waveform, to alternately arise as the DC bus voltage by selectively causing the first converter and the second converter to operate in one AC cycle of the AC electric path, the control unit detecting arm short-circuit in the second converter on the basis of a degree of reduction, in the DC bus voltage, that occurs during operation of the second converter wherein
    the degree of reduction is a slope of reduction, and a phenomenon in which the DC bus voltage reduces at a slope steeper than a threshold value is detected as arm short-circuit in the second converter.

2. A conversion device interposed between a DC power supply and an AC electric path, the conversion device comprising:
    a DC bus which is provided between the DC power supply and the AC electric path and to which a smoothing capacitor is connected;

a first converter provided between the DC power supply and the DC bus and configured to perform DC/DC conversion;

a second converter provided between the DC bus and the AC electric path and configured to perform DC/AC conversion or AC/DC conversion with use of switching elements connected in a full-bridge form;

a voltage sensor configured to detect voltage between both ends of the smoothing capacitor as DC bus voltage;

a voltage sensor configured to detect input voltage from the DC power supply; and a control unit configured to cause a part of an absolute value of an AC waveform, and a DC waveform, to alternately arise as the DC bus voltage by selectively causing the first converter and the second converter to operate in one AC cycle of the AC electric path, the control unit detecting arm short-circuit in the second converter on the basis of a degree of reduction, in the DC bus voltage, that occurs during operation of the second converter wherein the degree of reduction is a difference between the input voltage and the DC bus voltage, and a phenomenon in which the difference exceeds a threshold value is detected as arm short-circuit in the second converter.

3. A conversion device interposed between a DC power supply and an AC electric path, the conversion device comprising:

a DC bus which is provided between the DC power supply and the AC electric path and to which a smoothing capacitor is connected;

a first converter provided between the DC power supply and the DC bus and configured to perform DC/DC conversion;

a second converter provided between the DC bus and the AC electric path and configured to perform DC/AC conversion or AC/DC conversion with use of switching elements connected in a full-bridge form;

a voltage sensor configured to detect voltage between both ends of the smoothing capacitor as DC bus voltage; and a control unit configured to cause a part of an absolute value of an AC waveform, and a DC waveform, to alternately arise as the DC bus voltage by selectively causing the first converter and the second converter to operate in one AC cycle of the AC electric path, the control unit detecting arm short-circuit in the second converter on the basis of a degree of reduction, in the DC bus voltage, that occurs during operation of the second converter wherein when the arm short-circuit is detected, the control unit stops operations of the first converter and the second converter on the basis of a short-circuit withstand capability of the switching elements.

4. The conversion device according to claim 1, wherein when the arm short-circuit is detected, the control unit stops operations of the first converter and the second converter on the basis of a short-circuit withstand capability of the switching elements.

5. The conversion device according to claim 2, wherein when the arm short-circuit is detected, the control unit stops operations of the first converter and the second converter on the basis of a short-circuit withstand capability of the switching elements.

* * * * *